(12) United States Patent  
Missoum et al.

(10) Patent No.: US 7,415,943 B2  
(45) Date of Patent: Aug. 26, 2008

(54) SINGLE PASS FUEL-FIRED FLUID HEATING/STORAGE DEVICE

(75) Inventors: Ozzie Missoum, Pike Road, AL (US); Gregory M. Welk, Prattville, AL (US); Jeffrey M. Haney, Montgomery, AL (US); Phillip W. Stephens, Millbrook, AL (US); Qian Zhang, Montgomery, AL (US)

(73) Assignee: Rheem Manufacturing Company, New York, NY (US)

( * ) Notice: Subject to any disclaimer, the term of this patent is extended or adjusted under 35 U.S.C. 154(b) by 513 days.

(21) Appl. No.: 11/222,349

(22) Filed: Sep. 8, 2005

(65) Prior Publication Data

US 2007/0051358 A1  Mar. 8, 2007

(51) Int. Cl.  
*F24H 1/38* (2006.01)

(52) U.S. Cl. .................. 122/18.1; 122/18.3; 126/378.1

(58) Field of Classification Search ............. 122/18.1, 122/31.2, 18.3, 15.1, 247, 250 R; 126/116 R, 126/378.1; 165/163  
See application file for complete search history.

(56) References Cited

U.S. PATENT DOCUMENTS

| | | | |
|---|---|---|---|
| 4,203,392 A | 5/1980 | McLane | |
| 4,492,185 A | 1/1985 | Kendall et al. | |
| 4,641,631 A | 2/1987 | Jatana | |
| 4,651,714 A | 3/1987 | Granberg | |
| 4,677,939 A | 7/1987 | Henault et al. | |
| 4,685,425 A | 8/1987 | Eising | |
| 4,766,883 A | 8/1988 | Cameron et al. | |
| 4,790,268 A | 12/1988 | Eising | |
| 5,027,749 A * | 7/1991 | Cifaldi ................... | 122/18.31 |
| 5,085,579 A * | 2/1992 | Moore et al. ............ | 431/326 |
| 5,207,211 A | 5/1993 | Hanning et al. | |
| 5,636,598 A * | 6/1997 | Moore, Jr. .............. | 122/18.3 |
| 5,699,756 A | 12/1997 | Ross et al. | |
| 5,735,237 A * | 4/1998 | Phillip et al. .......... | 122/18.5 |
| 6,681,723 B1 | 1/2004 | Amendt et al. | |
| 7,258,080 B2 * | 8/2007 | Missoum et al. ........ | 122/18.1 |
| 7,316,206 B2 * | 1/2008 | Akkala et al. .......... | 122/244 |

FOREIGN PATENT DOCUMENTS

CA  2130961 A1  6/1995

OTHER PUBLICATIONS

Yunus A. Cengel, Heater Tranfer—A Practical Approach, International Edition, The McGraw-Hill Companies, Inc., 1998, 4 pages, ISBN 0-07-011505-2, Chapter 10.

Patent Examination B—Pravenn Jain—Australian Government IP Australia, Examiner's First Report on Patent Application No. 2006204645 by Rheem Manufacturing Company, Oct. 9, 2007, 2 pages.

* cited by examiner

*Primary Examiner*—Gregory A Wilson  
(74) *Attorney, Agent, or Firm*—Haynes and Boone, LLP

(57) ABSTRACT

A fuel-fired water heater has a single pass condensing-type heat exchanger disposed within its water storage tank portion. The heat exchanger includes a primary non-condensing portion defined by a combustion chamber positioned in an upper interior portion of the tank and having a spaced series of vertical tubes depending therefrom. A secondary condensing portion of the heat exchanger is defined by a plenum having a top side connected to the bottom ends of the vertical tubes, and a bottom side from which a downwardly coiled flue tube depends. A fuel burner generates hot combustion gases that are sequentially flowed into the combustion chamber and then downwardly through the balance of the heat exchanger in a single pass.

17 Claims, 1 Drawing Sheet

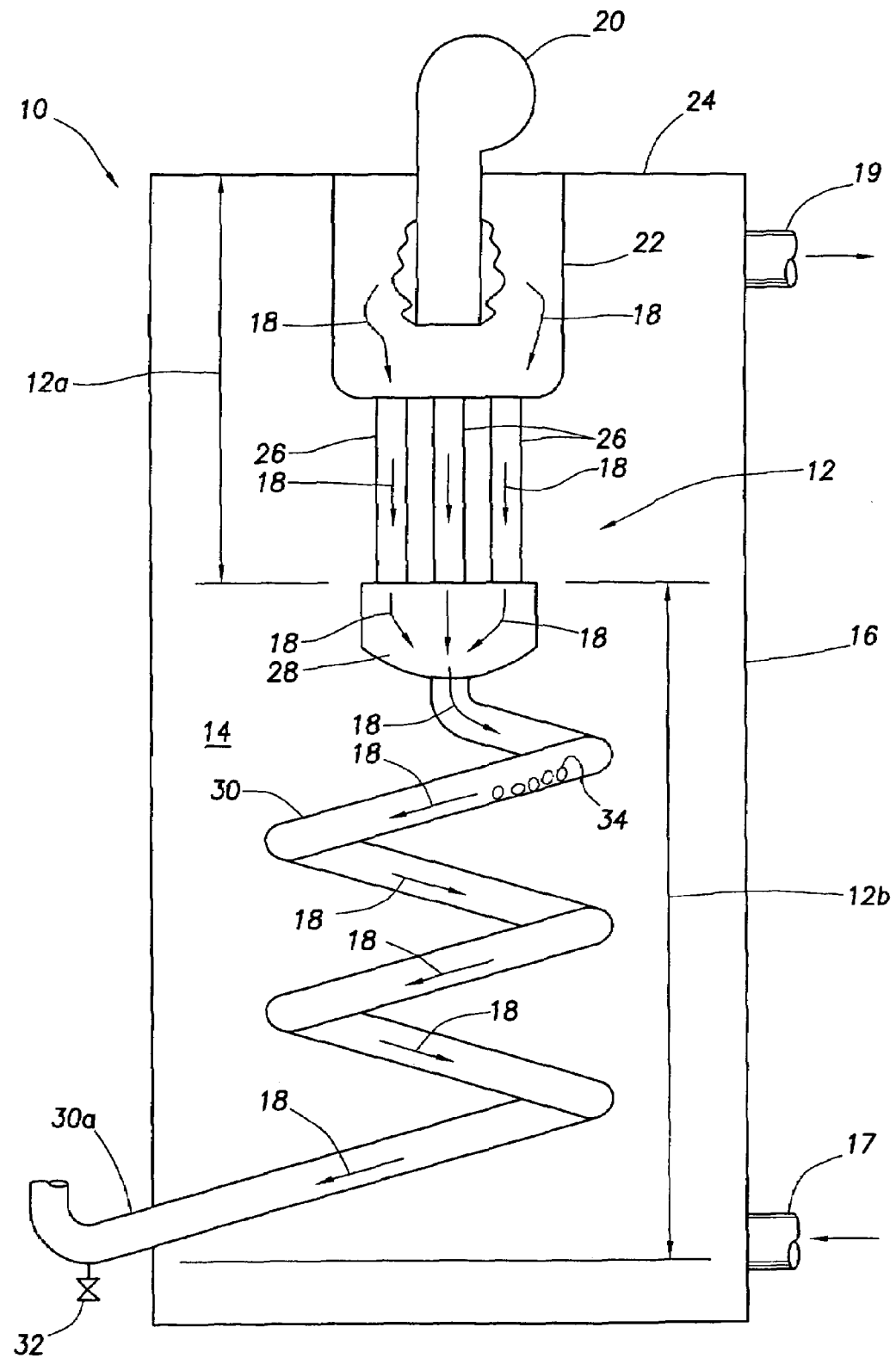

SINGLE PASS FUEL-FIRED FLUID HEATING/STORAGE DEVICE

BACKGROUND OF THE INVENTION

The present invention generally relates to fuel-fired fluid heating devices and, in a representatively illustrated embodiment thereof, more particularly provides a fuel-fired water heater having a specially designed single-pass condensing type heat exchanger incorporated therein.

Conventional fuel-fired water heaters are typically of a "single pass", non-condensing configuration, meaning that the hot combustion gases used to heat the tank-stored water are subjected to only a single pass through a heat exchanger structure (usually a vertical flue) within the tank before being discharged from the water heater to, for example, an external vent structure, and that flue gas condensation does not occur to any appreciable degree in the heat exchanger structure within the water heater tank. In this conventional type of fuel-fired water heater, the overall thermal efficiency is typically limited to about 80-85%. Various proposals have been made to provide fuel-fired water heaters with condensing type single-pass heat exchangers (i.e., in which flue gases condense within the heat exchanger). However, previously proposed single-pass condensing type heat exchange structures incorporated in fuel-fired water heaters typically provide the water heaters with maximum thermal efficiencies limited to the 85-90% range.

It would be desirable to provide a fuel-fired water heater with a single pass heat exchanger having a heat transfer efficiency of at least ninety five percent and preferably greater.

SUMMARY OF THE INVENTION

In carrying out principles of the present invention, in accordance with a representative embodiment thereof, a fuel-fired fluid heating apparatus is provided which is representatively a water heater but could alternatively be a variety of other types of fuel-fired fluid heating devices without departing from principles of the present invention.

From a broad perspective, the fuel-fired fluid heating apparatus includes a tank for holding a fluid to be heated, and a specially configured single pass heat exchanger, preferably of a condensing type, disposed in the interior of the tank. The heat exchanger includes a combustion chamber, a plenum spaced apart from the combustion chamber in a first direction, a spaced plurality of first flue tubes longitudinally extending in the first direction between, and interconnecting, the combustion chamber and the plenum, and a second flue tube coupled to the plenum and coiling away therefrom in the first direction, the second flue tube having an outlet portion exiting the tank. The fluid heating apparatus also has a combustion system operative to flow combustion gases sequentially through the combustion chamber, the first flue tubes, the plenum, and the second flue tube.

In a preferred embodiment thereof, the apparatus is a fuel-fired commercial water heater having a tank for holding a quantity of water to be heated, and a single pass condensing type heat exchanger disposed within the interior of the tank.

The heat exchanger has (1) a primary, non-condensing section defined by a combustion chamber disposed in a top portion of the tank, and a spaced plurality of primary flue tubes coupled to and longitudinally extending downwardly from the combustion chamber, and (2) a secondary, condensing section defined by a plenum connected to lower ends of the primary flue tubes, and a secondary flue tube coupled to the plenum, coiling downwardly away from the plenum through a lower interior portion of the tank, and having an outlet portion exiting the tank.

The fuel-fired water heater also has a water inlet disposed on the tank for admitting water directly into the lower interior portion of the tank, and a fuel burner operative to flow combustion gases sequentially through the combustion chamber, the primary flue tubes, the plenum, and the secondary flue tube.

According to other preferred aspects of the invention, (1) the primary, non-condensing portion of the heat exchanger is formed from a coated or non-coated metal material, and the secondary, condensing portion of the heat exchanger is formed from an acid resistant, coated or non-coated metal material, representatively a porcelainized metal material (2) the primary, non-condensing portion of the heat exchanger has a heat transfer rate per height substantially greater than the heat transfer rate per height of the secondary, condensing portion of the heat exchanger, and (3) and the single pass, condensing type heat exchanger has a heat transfer efficiency of at least 95 percent.

BRIEF DESCRIPTION OF THE DRAWING

The single drawing FIGURE schematically illustrates, in cross-sectional form, a fuel-fired water heater incorporating therein a specially designed single-pass condensing type heat exchanger embodying principles of the present invention.

DETAILED DESCRIPTION

Schematically illustrated in cross-section in the accompanying single drawing FIGURE is a fuel-fired water heater 10, representatively a commercial water heater, having a specially designed single pass condensing type heat exchanger 12 extending through the stored water 14 in its insulated tank portion 16. Tank 16, as illustrated, is provided with a lower water inlet fitting 17 and an upper water discharge fitting 19. During firing of the water heater 10, hot flue gases 18 from a burner 20 at the top of the water heater are flowed through the heat exchanger 12 to transfer combustion heat, with a thermal efficiency of 95% or above, to the stored water 14.

The heat exchanger 12 has an upper, non-condensing primary section 12a, and a lower, condensing secondary section 12b. Upper section 12a includes a submerged combustion chamber 22 extending downwardly into the water 14 from the top end 24 of the tank 16, and a spaced series of vertical flue tubes 26 extending downwardly from the bottom of the combustion chamber 22. Lower heat exchanger section 12b includes a collector plenum structure 28 connected to the bottom ends of the vertical flue tubes 26. A coiled flue tube 30 extends downwardly from the collector plenum 28 and exits a bottom portion of the tank 16 as a flue and condensate discharge portion 30a having a condensate drain fitting 32 connected thereto.

During firing of the water heater 10, flue gases 18 generated in the submerged combustion chamber 22 flow sequentially therefrom in a single pass downwardly through the flue tubes 26, into the plenum 28, and then downwardly through the coiled tube 30 for discharge, with condensate 34 formed in the lower heat exchanger section 12b, outwardly through the tube discharge portion 30a.

In addition to the unique configuration of the heat exchanger 12, other desirable features of the present invention are that the upstream, non-condensing portion 12a of the heat exchanger 12 (1) is designed to have an operating temperature (representatively about 1000 degrees F.) higher than the flue gas condensation temperature, and (2) has a larger cross-sectional heat transfer area per height than that of the lower, condensing section 12b of the heat exchanger section. This eliminates the need to form the upper heat exchanger section 12a from a more expensive porcelainized metal material used to form the lower heat exchanger section 12b to protect it from condensation-caused acidic corrosion. Instead, the upper heat exchanger section 12a may be more economically formed from a conventional coated or non-coated metal material. The lower heat exchanger section 12b is formed from an acid resistant coated or non-coated metal material, and is illustratively of a porcelainized metal construction.

In the illustrated single-pass condensing type heat exchanger structure 12 approximately seventy percent of the total combustion heat transferred to the stored water 14 comes from the upper primary, non-condensing section 12a of the heat exchanger 12. The remaining combustion heat transfer comes from the lower secondary, condensing section 12b of the heat exchanger 12, the condensing of the combustion gases 18 traversing the heat exchanger 12 being facilitated by the placement of the secondary, condensing heat exchanger section 12b in the water inlet zone of the water heater served by the bottom end inlet fitting 17.

The heat exchanger 12, as illustrated, preferably has a vertical, down-fired orientation, but could have other orientations, including a horizontal orientation, if desired without departing from principles of the present invention.

The foregoing detailed description is to be clearly understood as being given by way of illustration and example only, the spirit and scope of the present invention being limited solely by the appended claims.

What is claimed is:

1. A fuel-fired fluid heating apparatus comprising:
   a tank for holding a fluid to be heated;
   a single pass heat exchanger disposed in said tank and having:
      a combustion chamber,
      a plenum spaced apart from said combustion chamber in a first direction,
      a spaced plurality of first flue tubes longitudinally extending in said first direction between, and interconnecting, said combustion chamber and said plenum, and
      a second flue tube coupled to said plenum and coiling away therefrom in said first direction, said second flue tube having an outlet portion exiting said tank; and
   a combustion system operative to flow combustion gases sequentially through said combustion chamber, said first flue tubes, said plenum, and said second flue tube.

2. The fuel-fired fluid heating apparatus of claim 1 wherein:
   said fuel-fired fluid heating apparatus is a water heater.

3. The fuel-fired fluid heating apparatus of claim 1 wherein:
   said fuel-fired fluid heating apparatus is a commercial water heater.

4. The fuel-fired fluid heating apparatus of claim 1 wherein:
   said first direction extends downwardly.

5. The fuel-fired fluid heating apparatus of claim 1 wherein:
   said combustion system includes a fuel burner having an outlet communicated with the interior of said combustion chamber.

6. The fuel-fired fluid heating apparatus of claim 1 wherein:
   said single pass heat exchanger is a condensing type heat exchanger.

7. The fuel-fired fluid heating apparatus of claim 6 wherein:
   said condensing type heat exchanger has a primary, non-condensing portion defined by said combustion chamber and said first flue tubes, and a secondary, condensing portion defined by said plenum and said second flue tube.

8. The fuel-fired fluid heating apparatus of claim 7 wherein:
   said primary, non-condensing portion of said heat exchanger is formed from a metal material, and
   said secondary, condensing portion of said heat exchanger is formed from a porcelainized metal material.

9. The fuel-fired fluid heating apparatus of claim 7 wherein:
   said single pass heat exchanger has a length extending in said first direction, and
   said primary, non-condensing portion of said heat exchanger has a heat transfer rate per length substantially greater than the heat transfer rate per length of said secondary, condensing portion of said heat exchanger.

10. The fuel-fired fluid heating apparatus of claim 7 wherein:
    said tank has a fluid inlet disposed adjacent said secondary, condensing portion of said heat exchanger.

11. The fuel-fired fluid heating apparatus of claim 6 wherein, during operation of said combustion system:
    the temperature within said combustion chamber and said first flue tubes is above the condensation temperature of said combustion gases.

12. The fuel-fired fluid heating apparatus of claim 1 wherein:
    said single pass heat exchanger has a heat transfer efficiency of at least 95 percent.

13. A fuel-fired water heater comprising:
    a tank for holding a quantity of water to be heated;
    a single pass, condensing type heat exchanger disposed within the interior of said tank and having:
       a primary, non-condensing section defined by a combustion chamber disposed in a top portion of said tank, and a spaced plurality of primary flue tubes coupled to and longitudinally extending downwardly from said combustion chamber, and
       a secondary, condensing section defined by a plenum connected to lower ends of said primary flue tubes, and a secondary flue tube coupled to said plenum, coiling downwardly away from said plenum through a lower interior portion of said tank, and having an outlet portion exiting said tank;
    a water inlet disposed on said tank for admitting water directly into said lower interior portion of said tank; and
    a fuel burner operative to flow combustion gases sequentially through said combustion chamber, said primary flue tubes, said plenum and said secondary flue tube.

14. The fuel-fired water heater of claim 13 wherein:
    said fuel-fired water heater is a commercial water heater.

15. The fuel-fired water heater of claim 13 wherein:
    said primary, non-condensing portion of said heat exchanger is formed from either a coated or non-coated metal material, and
    said secondary, condensing portion of said heat exchanger is formed from an acid resistant, coated or non-coated metal material.

16. The fuel-fired water heater of claim 13 wherein:
said primary, non-condensing portion of said heat exchanger has a heat transfer rate per height substantially greater than the heat transfer rate per height of said secondary, condensing portion of said heat exchanger.

17. The fuel-fired water heater of claim 13 wherein:
said a single pass, condensing type heat exchanger has a heat transfer efficiency of at least 95 percent.

* * * * *